Reissued Dec. 19, 1944

Re. 22,579

UNITED STATES PATENT OFFICE 22,579

SENSITIZER CONTAINING A GEL-FORMING COLLOIDAL CLAY

Clyde A. Crowley, Chicago, and John B. Mullen, Elgin, Ill., assignors to The Huey Co., Chicago, Ill., a corporation of Illinois No Drawing. Original No. 2,317,521, dated April 27, 1943, Serial No. 416,046, October 22, 1941. Application for reissue September 18, 1944, Serial No. 554,599½

9 Claims. (Cl. 95—7)

This invention relates to improvements in the sensitized layers of photosensitive papers, and to means of accomplishing these improvements. An object of this invention is the formation of sensitized layers with improved properties, particularly sensitized layers which have higher printing speed, which can be washed more rapidly, and which will give images of greater sharpness, better definition, and improved clarity.

The types of sensitizers to which our invention is applied are so-called "blueprint" sensitizers, either of the negative or direct positive type; diazo sensitizers; and direct line iron sensitizers. In general, our invention can be used with any such type of sensitized layer which is applied to a base of paper, cloth, or the equivalent from a solution in water, whatever the active light sensitive chemicals thereof may be.

In the ordinary process of preparing blueprint papers, paper or other suitable base is coated with a solution which comprises light-sensitive ferric compounds such as ammonium ferri-oxalate, a ferricyanide salt, and usually so-called "solubilizing" or buffering agents such as potassium oxalate, which are used primarily to improve the keeping and washing quality of the sensitized paper. The customary practice is to pass the paper stock over coating rollers, which apply the sensitizing solution, after which the paper is dried. It is common practice to apply two coats of the sensitizing solution before drying. The papers are subsequently exposed to light under a design, washed to remove unreacted chemicals, developed in a solution of an oxidizing agent such as potassium dichromate, and rinsed before drying. The resulting prints are negatives of the original design, with white lines on a blue background.

This process suffers from a number of disadvantages. In the first place, the sensitizer penetrates into the paper below the surface for a considerable distance. This has two undesirable effects: first, it slows down the action of light on the sensitive chemicals appreciably, since these chemicals are partially concealed in the paper matrix; and secondly, for the same reason, it makes washing slower than is desirable and often less thorough. In addition, partially because washing must be protracted, some chemicals may wash or "bleed" from the exposed to the unexposed areas, causing indistinct lines and images. The contrast is also reduced thereby.

In other types of sensitive papers of the general type described above, the same difficulties occur also in greater or less degree. The disadvantages generally found in processes in which an aqueous sensitizing solution is applied to paper or similar base, and arising largely from penetration of the sensitizer into the paper, can be summarized briefly as follows:

(1) The speed is reduced by penetration; (2) the ease, speed, and completeness of washing are lowered; and (3) the possibility of bleeding and of indistinct lines is increased. All or some of these difficulties are found in blueprint papers, whether of the ordinary "lemon-yellow" type containing ferricyanide, or the "blue-blue" type containing ferrocyanide; in diazo papers; and in the various direct line iron papers.

Various means have been tried to eliminate these troubles. By increasing the concentration of the sensitizer, it is possible to increase its viscosity and, therefore, to reduce penetration. However, this method causes great difficulty in the coating plant, since the highly concentrated solutions are subject to crystallization when slight evaporation or change in temperature occurs, and will, therefore, change in composition (affecting the nature of the sensitized layer), and may even deposit crystals on the paper web. The use of a hard-surfaced paper has also been tried, which reduces penetration and actually makes it possible to eliminate the loss in speed and slowness of washing caused by penetration. However, in practice it is not possible to use a paper with a sufficiently hard-sized, non-absorbent surface to eliminate these effects entirely, since to do so would mean that the sensitized layer on the paper would be so thin that it would give grossly insufficient pigmentation. Also, since with a paper of this type of surface there is no means of bonding the sensitizing chemicals to the paper, and they are actually laid on the surface, bleeding is actually increased rather than reduced.

Some means of attaching the sensitized layer firmly to the paper is required, and no better method for use with aqueous solution sensitizers has been found than penetration into the paper. The best that has been done to date is to attempt to control the penetration by means of the surface size on the paper.

We have discovered a method whereby aqueous solution sensitizers of the types described above in aqueous solution can be applied to paper or similar base, which eliminates in whole or in part these objectionable features found hitherto. Our invention consists in the use of a sensitizing solution which contains bentonite or an equivalent type of gel-forming colloidal clay, which is coated onto the paper or other base. By the use of such a sensitizer, it is possible to obtain a sensitized coating which is substantially on the surface of the paper, so that it is in a position to react most rapidly with the light; soluble unreacted chemicals can be washed out more readily and completely, and as the bentonite (or its equivalent) serves to bind the chemicals to the paper, reaction products are less likely to be washed into the unexposed areas.

In the practice of this invention, an aqueous sensitizing solution or suspension containing the light-sensitive chemicals and bentonite is applied to the surface of the paper, cloth or other base by any suitable means. One method of application is the use of coating rollers similar to those ordinarily used with aqueous sensitizers; by adjusting the tension on the paper as it passes over the coating rollers, it is possible to lay down a satisfactory film, which is smoothed, and excess material removed, if necessary, by use of a squeegee rod or a doctor's knife. Other methods of application can also be used, and will readily suggest themselves to those skilled in the art; and our invention is not limited to any method of application of the sensitized layer.

The amount of bentonite required varies with the nature of the paper or other base and with the nature of the sensitizing solution. The quantity of bentonite should be sufficient to increase the viscosity of the sensitizer, and to prevent substantially all penetration into the paper. With relatively hard-surfaced papers, or papers with a relatively impervious size, this will naturally require less bentonite than with softer, more porous papers. Also, the nature and amounts of ions present and also the relative order of mixing of the components of the sensitizer affect the viscosity and other characteristics of the final sensitizer. In general, it has been found that from 1% to 10% by weight of bentonite will give satisfactory effects.

In practicing this invention, it is preferable to use a relatively hard-surfaced paper which has a low tendency to absorb water. Such a paper can be prepared by use of a glue size which is subsequently tanned by formaldehyde or other agents, by sizing with resins such as urea-formaldehyde type, by use of other types of surface sizes, or by super calendering, or by combinations of these means or by other means. However, it is possible by proper control of the sensitizer to obtain good results even on papers of more open or porous structure, and our invention is not limited to any particular type of paper.

We have mentioned the fact that bentonite increases the viscosity of the sensitizer; however, this is not believed to be the sole explanation of its effect in reducing penetration into the paper. If such were the case, it would be possible simply by increasing the content of dissolved solids, for example by the addition of sugar, to increase the viscosity sufficiently to reduce penetration. However, although this has been attempted in the past, it is possible to achieve the effect desired only to a limited extent by this method. Bentonite and other gel-forming colloidal clays are hydrophilic colloids, and when dispersed in water they reduce the amount of free or available water. By so doing bentonite increases the viscosity of the solution, but its effects are not ascribable to the increased viscosity alone, but rather to the reduction in the free water, since all or a large part of the water is linked to the bentonite (or to the ions) as water by hydration. While this is believed to be the true explanation of the action of bentonite, our invention is not limited to this explanation.

*Example I*

| | | | |
|---|---|---|---|
| A. | Bentonite | g | 10 |
| | Water | ml | 96 |
| B. | Ammonium oxalate | g | 6 |
| | Citric acid | g | 6 |
| | Ferric ammonium oxalate | g | 39 |
| | Potassium ferricyanide | g | 5 |
| | Water to make | ml | 244 |

(Density 13° Bé.)

The B solution is added to the bentonite suspension A while stirring. The paper sensitized with this solution is exposed under a design to light, washed, developed with an oxidizing agent, and again washed. Paper coated with this sensitizer is faster and washes better giving clearer prints than paper sensitized with a sensitizer identical in composition except for the omission of the bentonite.

*Example II*

| | | | |
|---|---|---|---|
| A. | Bentonite | g | 16.00 |
| | Water | ml | 145.00 |
| B. | Oxalic acid ($H_2C_2O_4.2H_2O$) | g | 6.00 |
| | Potassium carbonate ($K_2CO_3.2H_2O$) | g | 13.31 |
| | Potassium ferrocyanide | g | 15.00 |
| | Potassium ferricyanide | g | 0.375 |
| | Ferric ammonium oxalate | g | 30.00 |
| | Water to make | ml | 314 |

(Density 13.2° Bé.)

Solution B is added to the bentonite dispersion A while stirring. The paper sensitized with this solution is exposed under a design to light, washed to remove excess or unreacted chemicals, treated with an oxidizing agent, washed again, and dried. The paper so sensitized gives higher printing speed, easier washing and sharper prints than paper prepared with the same sensitizer with bentonite omitted.

*Example III*

A diazo sensitizer is prepared as follows:

| | | | |
|---|---|---|---|
| A. | Diazo sensitizer | g | 70.0 |
| B. | Bentonite | g | 3.0 |
| | Water | | |

A is added to B and mixed thoroughly. The mixture is coated on to paper, and the paper is exposed under a design to light. Development is effected with an alkaline solution of a coupling agent consisting of phloro-glucinol, resorcinol, sodium carbonate, and water.

Diazo papers can also be prepared under this invention by incorporating in the sensitizer the coupling compounds; the sensitizer must then be acid to prevent coupling. Such papers are developed after exposure by treatment with a solution of an alkali or by exposure to a moist atmosphere containing ammonia or other alkaline vapor.

The term "bentonite" is intended to describe the colloidal clay found almost exclusively in Wyoming. The term is not a trade name, but a generic name descriptive of the clay found in the Fort Benton area. There are other similar colloidal clays found in other parts of the United States and known as subbentonite clays and available for use, although with less effectiveness in the use outlined in the foregoing description.

It will be understood that this invention is not restricted to the particular sensitizers shown which are cited merely as examples of the type with which our invention is concerned; and no unnecessary restrictions are to be assumed therefrom.

What we claim as new and desire to protect by United States Letters Patent is:

1. A sensitizer comprising a gel-forming colloidal clay and light-sensitive chemicals selected from the group consisting of (1) blueprint sensitizers, (2) diazo sensitizers and (3) direct line iron sensitizers.

2. A sensitizer comprising a gel-forming colloidal clay and an aqueous solution of light-sensitive chemicals selected from the group consisting of (1) blueprint sensitizers, (2) diazo sensitizers and (3) direct line iron sensitizers.

3. A sensitizer comprising gel-forming bentonite and light-sensitive chemicals selected from the group consisting of (1) blueprint sensitizers, (2) diazo sensitizers, and (3) direct line iron sensitizers.

4. A sensitizer comprising gel-forming bentonite and an aqueous solution of light-sensitive chemicals selected from the group consisting of (1) blueprint sensitizers, (2) diazo sensitizers and (3) direct line iron sensitizers.

5. A sheet containing a layer of gel-forming bentonite and light-sensitive chemicals selected from the group consisting of (1) blueprint sensitizers, (2) diazo sensitizers and (3) direct line iron sensitizers.

6. A sheet having a composite layer including gel-forming bentonite and light-sensitive chemicals selected from the group consisting of (1) blueprint sensitizers, (2) diazo sensitizers and (3) direct line iron sensitizers, said bentonite acting to inhibit penetration of the sensitizer into the body of the sheet.

7. A sheet having a composite layer including gel-forming bentonite and light-sensitive chemicals, said gel-forming bentonite acting to inhibit penetration of the light-sensitive chemicals into the body of the sheet, said gel-forming bentonite being present in the proportion of 1 to 10% by weight of the light-sensitive chemicals, said light-sensitive chemicals being selected from the group consisting of (1) blueprint sensitizers, (2) diazo sensitizers and (3) direct line iron sensitizers.

8. A sensitizer for blueprint paper including a light-sensitive ferric compound and a minor proportion of a gel-forming colloidal clay.

9. Blueprint paper comprising a sheet having a composite layer including a sensitizer comprising light-sensitive ferric compound and a minor proportion of a gel-forming colloidal clay, said clay acting to inhibit penetration of the sensitizer chemicals into the body of the sheet.

CLYDE A. CROWLEY.
JOHN B. MULLEN.